B. E. DOHNER AND A. J. HUFF.
ROLLER BEARING.
APPLICATION FILED JULY 24, 1919.

1,404,940.

Patented Jan. 31, 1922.

Witness
M. Liebler

Inventors,
Burt E. Dohner
Albert J. Huff
By R. J. McCarty
Their Attorney

UNITED STATES PATENT OFFICE.

BURT E. DOHNER AND ALBERT J. HUFF, OF DAYTON, OHIO.

ROLLER BEARING.

1,404,940.   Specification of Letters Patent.   Patented Jan. 31, 1922.

Application filed July 24, 1919. Serial No. 312,884.

*To all whom it may concern:*

Be it known that we, BURT E. DOHNER and ALBERT J. HUFF, citizens of the United States, residing at Dayton, in the county of Montgomery and State of Ohio, have invented certain new and useful Improvements in Roller Bearings, of which the following is a specification.

This invention relates to certain improvements in roller bearings, and the object of the said invention is to provide a durable and efficient roller bearing that is capable of being made in sizes ranging from the largest to the smallest possible sizes that are demanded by the trade, and the structural advantages be retained regardless of size.

The accompanying drawings illustrate the roller bearing and reference is made thereto in general terms.

In a more particular description to follow similar reference characters indicate corresponding parts in the several views of the drawings.

Figure 1:
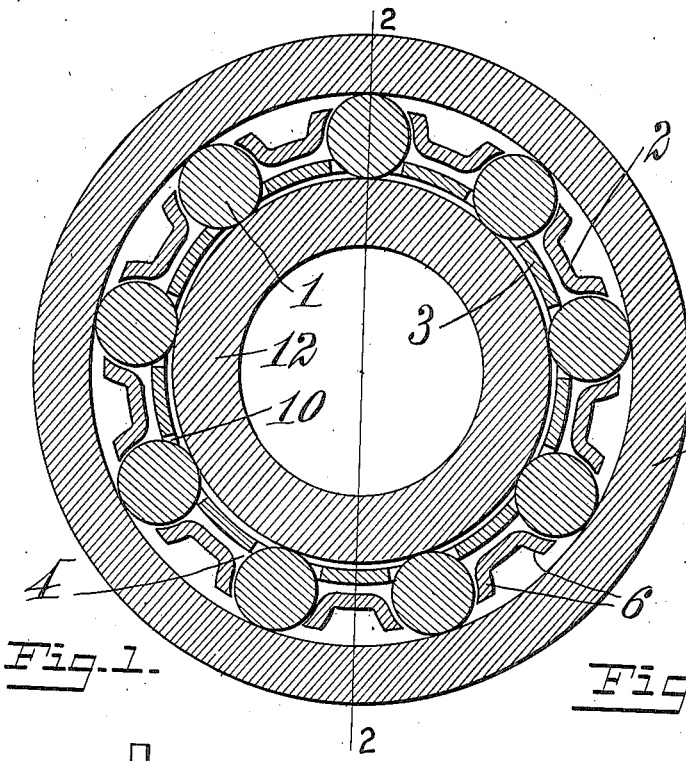
Fig. 1 is a sectional view thereof on the line 1—1 of Fig. 2.
Figure 2:
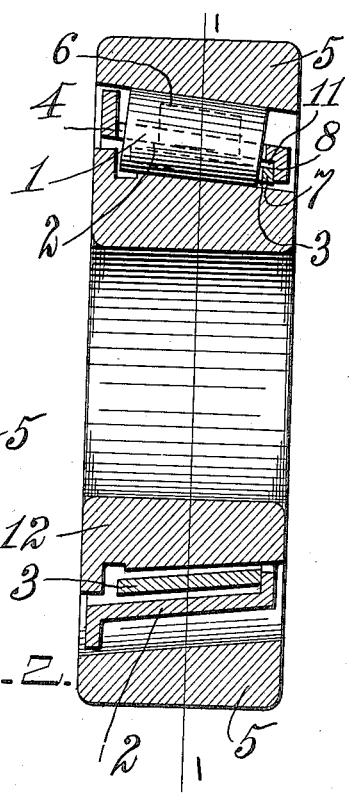
Fig. 2 is a sectional view on the line 2—2 of Fig. 1.
Figure 3:
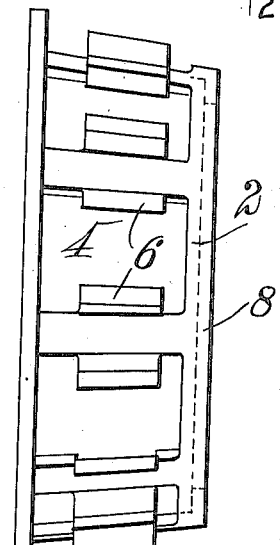
Fig. 3 is a view of the outer retaining member removed from the assemblage as shown in Figs. 1 and 2.
Figure 4:
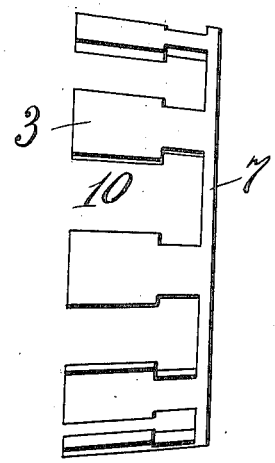
Fig. 4 is a similar view of the inner retaining member removed from its association with the outer retaining member.

As shown in the said drawings the rollers —1— are of a cylindrical form from end to end and are slightly tapered from end to end, therefore they are capable of meeting any end thrusts that may come upon the bearing. The cage in which said rollers are confined consists of an outer retaining member —2— and an inner retaining member formed of bars —3— extending from a ring —7—. The inner member is nested within the outer when in an operative position. The said inner retaining member is free from any connection with the outer retaining member when the two members are assembled. The said outer retaining member consists of a series of bars joined at their ends by outwardly and inwardly extended flanges and the said member has throughout its circumference roller openings —4— through which the surfaces of the rollers are exposed to the adjacent surface of the outer roller race or member —5—, said surface being tapered to conform to the tapered form of the rollers. At the sides of the said roller openings —4— lips —6— project which are bent inwardly over the openings sufficiently to reduce the width of the openings and thereby prevent the rollers falling outwardly from the cage when the said cage is removed bodily from the two roller race members. The inner retaining member as shown more clearly in Fig. 4, lies within the outer retaining member and when in position therein the ring —7— thereof abuts with the inturned flange —8— at the smaller end of the outer retaining member —2—. The said inner retaining member has a series of open end roller recesses —10— which lie flush with the roller openings in the outer retaining member when the two retaining members are nested together. Through these recesses —10— the rollers are exposed to the adjacent surface of the inner roller race member —12—, said inner surface being tapered to conform to the surface of the rollers. When the inner retaining member is placed in position as is shown in Fig. 2, the ends of the rollers lie on the inside of the ring —7— and the inner retaining member is thereby prevented from dislodging from the bearing endwise, and the rollers are prevented from dislodging by both the said retaining members. When in position there is some necessary clearance as indicated at —11— in Fig. 2 between the inner surface of the inner retainer member and the outer adjacent surface of the inner roller race member so that there may be no contact between said parts and consequently no friction.

By thus constructing a cage for roller bearings, the same may be made of heavier stock and a greater width of bearing may be utilized for the rolling surface, thereby providing for durability and efficiency.

Having described our invention, we claim:

In a roller bearing, a cage consisting of an outward retaining member formed with a series of annularly disposed bars joined at the ends thereof by outwardly and inwardly extended flanges with roller openings between said bars, an inner retaining member consisting of a series of annularly disposed bars joined at one end to a ring and providing a series of open end roller recesses, a series of rollers substantially cylindrical throughout their length mounted in the openings of both retaining members, the ring of the inner retaining member abutting on one side with the inward extended flange of the outer retaining member and on the other side with the adjacent ends of the rollers.

In testimony whereof we affix our signatures.

BURT E. DOHNER.
ALBERT J. HUFF.